Jan. 8, 1929.   1,698,581
D. F. CAMPBELL ET AL
AUTOMATIC REGULATION OF THE POWER FACTOR IN ELECTRIC FURNACES
Filed Jan. 4, 1928   2 Sheets-Sheet 1
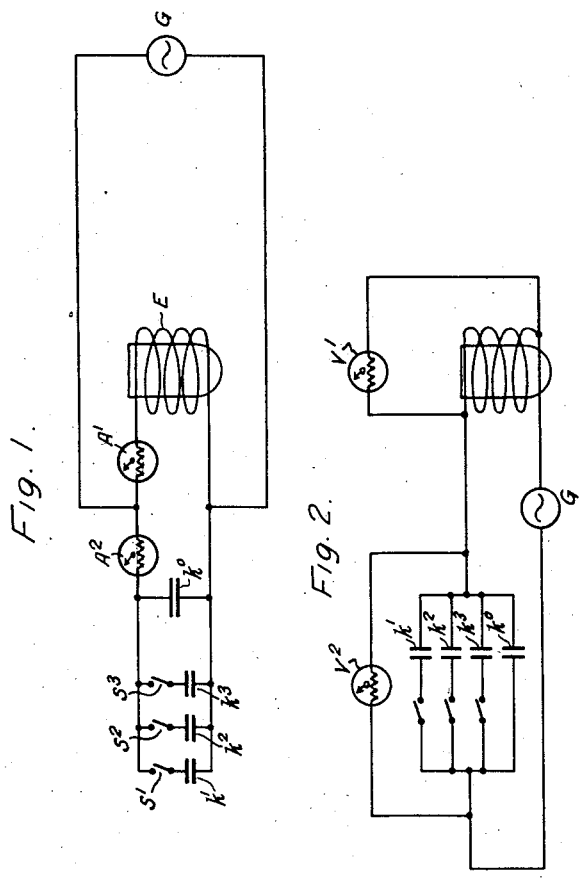
Inventors
Donald F. Campbell
George E. Taylor
By
Attorney

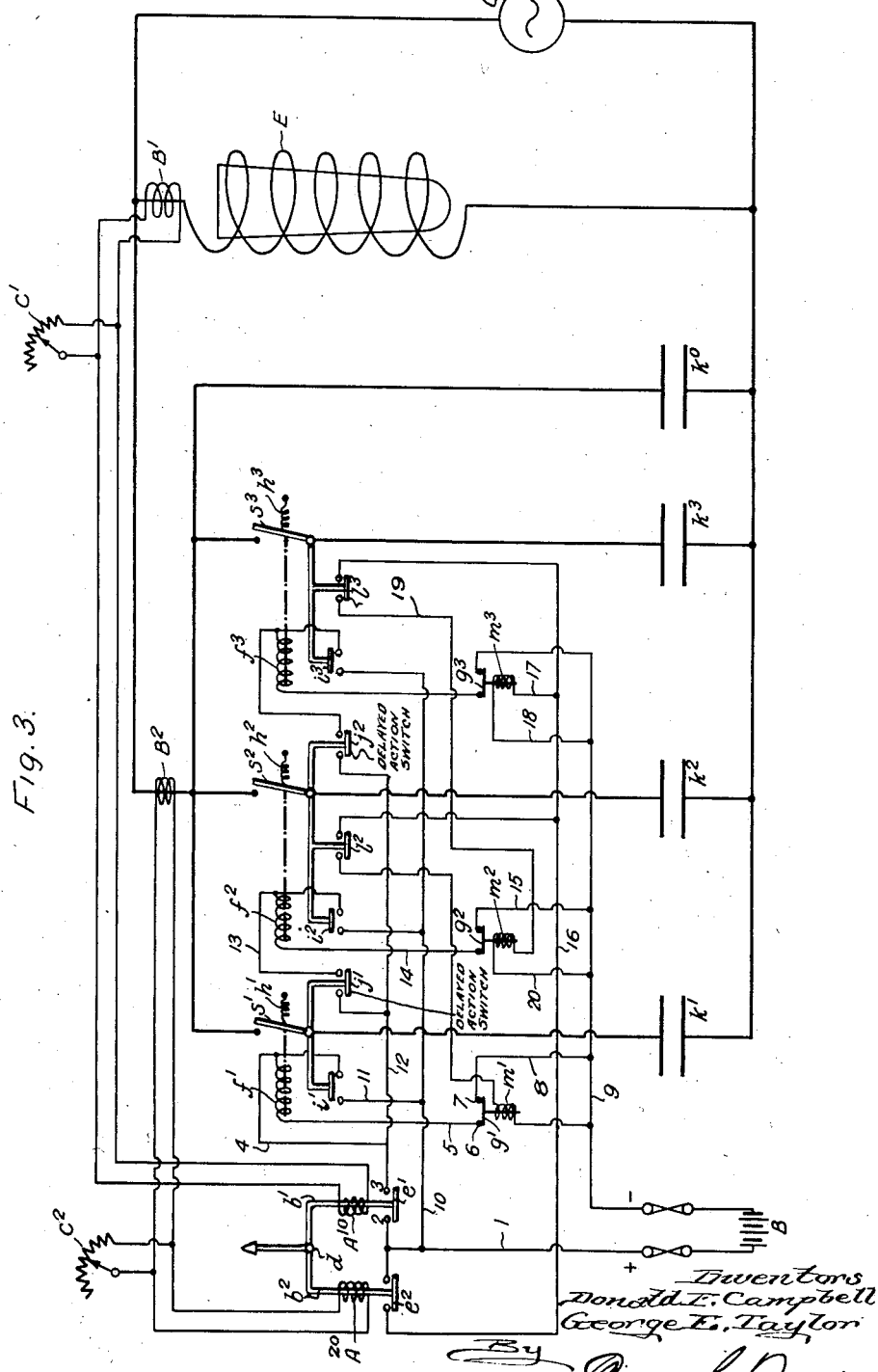

Patented Jan. 8, 1929.

1,698,581

UNITED STATES PATENT OFFICE.

DONALD FRASER CAMPBELL AND GEORGE EDWARD TAYLOR, OF LONDON, ENGLAND.

AUTOMATIC REGULATION OF THE POWER FACTOR IN ELECTRIC FURNACES.

Application filed January 4, 1928, Serial No. 244,494, and in Great Britain December 20, 1926.

The invention relates to the regulation of the power factor in electrical circuits such as those used in conjunction with electrical heating and melting furnaces energized by alternating currents, more particularly by high frequency currents.

The circuit arrangements of such furnaces usually include an inductor coil or primary circuit surrounding the container in which the metal or material to be heated, which forms the secondary circuit, is contained.

In electric circuits of this type any change in the impedance of the secondary circuit causes a change in the impedance of the primary circuit. It will, therefore, be obvious that the impedance of the inductor coil will vary according to the nature of the metal placed in the container, its resistance, which varies as the temperature alters, and on the size and form of the particles of the material.

Owing to the inherent characteristics of this type of heating, the power factor of the above circuit is very low, and therefore for commercial use it is necessary to correct the power factor so as to bring it as near unity as possible.

For this purpose, static condensers are placed either in parallel or in series with the inductor coil.

Owing to the change of impedance of the coil during the period of heating or melting, it is necessary to vary the capacity in the circuit to maintain the power factor at or about unity.

If a voltage is impressed upon the condenser and coil arranged in parallel, the current flowing through each circuit will depend on the impedance of that circuit, or if the coil and condenser are in series with each other, the voltages across the coil and the condenser respectively will vary according to the impedance and current in the circuits.

According to the invention in order to maintain the power factor at the required value, two solenoids or other suitable magneto-electric devices are energized either by the current or voltage in the inductor coil and condenser circuit respectively.

The energized coils may, for example, act in opposite directions on a plunger, so that when the currents in the coils are equal a pointer attached to the plunger is at the zero of an indicating scale, and moves to one side or other of the scale as the force due to one or other of the currents predominates.

Alternatively, the currents may act independently on two plungers, pointers on which are arranged to rotate independently about the same axis, so that any inequality in the currents is indicated by the divergence of the pointers, which may be differently coloured.

The capacity may be adjusted by hand in order to bring the single pointer to its zero indication or the two pointers into coincidence and, consequently, to adjust the power factor to the required value.

In a preferred form the adjustment is made automatically. For this purpose a plunger energized by the opposing currents is adapted to make and break circuits to which contactor switches are connected by which condenser units can be inserted in, or removed from, the circuit.

In the accompanying drawings which represent diagrammatically circuit arrangements according to the invention—

Figs. 1 and 2 show the capacity connected respectively in parallel and in series with the main energizing coil, and Fig. 3 is an example of a circuit in which the capacity is automatically increased or reduced to maintain the power factor at the required value.

Referring to Fig. 1, G is a generator or other source of alternating current, the main energizing coil of the primary circuit of the furnace is shown at E and $k^1$, $k^2$, $k^3$ represent condensers which can be inserted or removed as required by closing or opening switches $s^1$, $s^2$, $s^3$.

The condenser $k^0$ is shown as permanently connected in the circuit.

$A^1$, $A^2$ are the electromagnetic devices energized respectively by current flowing in the circuits of the coil E and of the condensers.

Indicators are assumed to be attached to the moving members of the devices $A^1$, $A^2$ shown in Fig. 1 or the devices $A^{10}$, $A^{20}$ shown in Fig. 3, and according to the indicators the switches $s^1$, $s^2$, $s^3$ etc. are opened or closed either manually as in Fig. 1, or automatically as in Fig. 3. As previously explained, the indicating devices $A^1$, $A^2$ may be combined in a single instrument, as shown in Fig. 3, a plunger or other moving member being energized by the differential action of the currents flowing respectively in the condenser circuit and the main energizing coil.

In Fig. 2 the condensers are connected in series with the coil E and the indicating instruments $V^1$, $V^2$ are energized by the voltages across the coil E and the condensers respectively.

Referring to Fig. 3, the electromagnetic coils $A^{10}$, $A^{20}$ are similar to the electromagnetic devices $A^1$, $A^2$ shown in Fig. 1. $B^1$ and $B^2$ are current transformers in the circuit of the coil E and the capacity respectively. $C^1$ and $C^2$ are resistances shunting the coils $B^1$, $B^2$.

The plungers $b^1$, $b^2$ are connected together and pivoted at $d$ and are so arranged that if the current in the coil $A^{10}$ is greater than the current in the coil $A^{20}$, the plunger $b^1$ is drawn upwards and a switch $e^1$ is closed. This implies that the power factor is below the predetermined value and requires for its adjustment that the capacity should be increased.

Current flows from the positive pole of a source B of direct current over lead 1, contact 2, switch $e^1$, contact 3, lead 4, magnetizing coil $f^1$, lead 5, contacts 6 and 7 closed by switch $g^1$, leads 8 and 9 to the negative pole of the battery B.

When coil $f^1$ is energized it closes its armature switch $s^1$ against the action of a spring $h^1$ and inserts the condenser $k^1$ in parallel with $k^0$.

A locking circuit for the coil $f^1$ independent of the switch $e^1$ is provided over leads 1, 10, 11, switch $i^1$ closed by the armature $s^1$, coil $f^1$, lead 5, contacts 6 and 7, leads 8 and 9 to the negative pole of the battery B.

Armature $s^1$ also closes a switch $j^1$, but this switch $j^1$ has a delayed action, so that it is only closed if the contacts of the switch $e^1$ are maintained closed for a predetermined interval of time.

The continued closure of switch $e^1$ for the time necessary to close switch $j^1$ implies that the capacity requires to be further increased and a circuit is now established over lead 1, contacts 2 and 3, switch $e^1$, lead 12, switch $j^1$, lead 13, coil $f^2$, lead 14, closed switch $g^2$, leads 15 and 9 to the negative pole of the battery B. Coil $f^2$ attracts its armature $s^2$ against the resistance of spring $h^2$ and inserts the condenser $k^2$ in parallel with $k^0$ and $k^1$. Armature $s^2$ closes switch $i^2$ and a delayed action switch $j^2$ and opens switch $l^2$. Switch $i^2$ provides a locking circuit for coil $f^2$ over closed switches $i^2$ and $g^2$ and over $j^2$ after a predetermined time connects up coil $f^3$ to battery B if switch $e^1$ is still closed.

Assuming that the condensers $k^1$, $k^2$, $k^3$ are connected in parallel with $k^0$ and that the impedance of coil E is reduced, so that the capacity is too great to obtain the predetermined value of the power factor, the plunger $b^2$ will close switch $e^2$ and plunger $b^1$ will open switch $e^1$.

Current now flows from positive pole of battery B, over lead 1, switch $e^2$, leads 16 and 17, magnetizing coil $m^3$, leads 18 and 9 to the negative pole of the battery. The energized coil $m^3$ opens switch $g^3$ and thereby interrupts the locking circuit of coil $f^3$, the main circuit of which was interrupted when contacts 2 and 3 were opened by $e^1$. Armature $s^3$ is released by spring $h^3$ and condenser $k^3$ is cut off from the circuit; $l^3$ is also closed after a predetermined time.

If $e^2$ still remains closed, coil $m^2$ is energized by current from positive pole of battery B, lead 1, switch $e^2$, lead 16, closed switch $l^3$, lead 19, coil $m^2$, leads 20 and 9 to negative pole of battery.

Capacity $k^2$ is now cut out by the interruption of its locking circuit at $g^2$.

Similarly, if $e^2$ is still closed after $k^2$ is cut out, coil $m^1$ is energized over closed switches $l^3$, $l^2$ and condenser $k^1$ is cut out.

While only three removable capacities or condenser units $k^1$–$k^3$ are shown in Figs. 1–3, it is obvious that their number can be increased largely according to the requirements of the installation.

The circuit arrangements shown can be easily modified for the case in which the capacity is in series, instead of in parallel, with the main energizing coils.

Having thus described the nature of our said invention and the best means we know of carrying the same into practical effect, we claim :—

1. A device for approximately maintaining the power factor of a load circuit of an alternating current electric furnace comprising a source of alternating current, a circuit including inductive and condensive elements connected to said source, means for introducing said condensive elements into and removing them from said circuit, and electro-magnetic indicating means embodying windings coupled respectively to said inductive and condensive elements and energized in accordance with the electrical conditions existing therein.

2. A device for approximately maintaining the power factor of a load circuit of an alternating current electric furnace comprising a source of alternating current, a circuit including inductive and condensive elements connected to said source, means for introducing said condensive elements into and removing them from said circuit, and electro-magnetic means for controlling the introduction and removal of the condensive elements with respect to said circuit embodying opposed windings coupled respectively to the inductive and condensive elements and energized respectively in accordance with the electrical conditions existing therein.

3. A device for approximately maintaining the power factor of a load circuit of an alternating current electric furnace comprising a source of alternating current, inductive and condensive branched circuits therefrom, an inductor in the inductive circuit, condensers adapted to be introduced into the condensive circuit, transformers having primaries respectively in the two circuits, electro-magnetic indicating mechanism energized by the secondaries of said transformers, the electro-magnetic effects of the secondaries being opposed one against the other, and means for introducing said condensers into the condensive circuit according to the indications of said indicating mechanism.

4. A device for approximately maintaining the power factor of a load circuit of an alternating current electric furnace comprising a source of alternating current, inductive and condensive branched circuits therefrom, an inductor in the inductive circuit, condensers in the condensive circuit adapted to be inserted therein or withdrawn therefrom, transformers having primaries respectively in the two circuits, sets of switches adapted, respectively, one set progressively to insert and the other progressively to withdraw condensers, electro-megnetic means for operating the switches alternatively having opposed windings energized respectively by the two secondaries of said transformers and depending, for the selection, upon which winding has the predominant energization, and electromagnetic means and connections for causing the closing of the switches of one set to insert and of the other set to withdraw condensers.

5. In a device for maintaining a substantially predetermined power factor in the supply circuit for an alternating current furnace, a source of alternating current supply, an inductor circuit connected therewith, condensive power factor correction means cooperative with the inductor circuit, transformers whose primaries are responsive to the current flow through the inductor circuit and condensive correction means respectively, opposed electro-magnetic means energized, respectively, by the secondaries of the transformers, an indicator controlled by said electro-magnetic means whereby the relation of the currents through the inductor circuit and correction means may be determined, and means for varying said correction means according to the determinations of the indicator.

6. In a device for maintaining a substantially predetermined power factor in the supply circuit for an alternating current furnace, a source of alternating current supply, an inductor circuit connected therewith, condensive power factor correction means including a plurality of condensers cooperative with the inductor circuit, transformers whose primaries are responsive to the current flow through the inductor circuit and condensers, respectively, opposed electro-magnetic connections form the secondaries of the transformers, electric switches controlled by the preponderance of energization of one or the other of said opposed electro-magnetic connections by one or the other of the two sceondaries, circuits closed alternatively by said switches, and electro-magnetic operating connections controlled by said alternatively closed circuits whereby the number of condensers in circuit is increased or diminished according to which switch is closed.

In testimony whereof we have signed our names to this specification.

DONALD FRASER CAMPBELL.
GEORGE EDWARD TAYLOR.